United States Patent
Schwinn et al.

(10) Patent No.: US 8,291,201 B2
(45) Date of Patent: Oct. 16, 2012

(54) DYNAMIC MERGING OF PIPELINE STAGES IN AN EXECUTION PIPELINE TO REDUCE POWER CONSUMPTION

(75) Inventors: Stephen Joseph Schwinn, Woodbury, MN (US); Matthew Ray Tubbs, Rochester, MN (US); Charles David Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 12/125,135

(22) Filed: May 22, 2008

(65) Prior Publication Data

US 2009/0292907 A1 Nov. 26, 2009

(51) Int. Cl.
*G06F 7/38* (2006.01)
*G06F 9/00* (2006.01)
*G06F 9/44* (2006.01)
*G06F 1/26* (2006.01)
*G06F 1/32* (2006.01)
*G06F 1/00* (2006.01)

(52) U.S. Cl. ......... 712/229; 713/320; 713/322; 713/323

(58) Field of Classification Search .................. 712/229; 713/320, 322, 333
See application file for complete search history.

(56) References Cited

U.S. PATENT DOCUMENTS

| | | | |
|---|---|---|---|
| 4,980,851 A * | 12/1990 | Komori et al. | 713/320 |
| 6,247,134 B1 * | 6/2001 | Sproch et al. | 713/320 |
| 7,076,682 B2 * | 7/2006 | Jacobson | 713/600 |
| 2004/0098630 A1 * | 5/2004 | Masleid | 713/320 |
| 2009/0213668 A1 * | 8/2009 | Zhang et al. | 365/189.011 |

OTHER PUBLICATIONS

Wikipedia—"CPU power dissipation".*

* cited by examiner

*Primary Examiner* — Eddie P Chan
*Assistant Examiner* — William Partridge
(74) *Attorney, Agent, or Firm* — Wood, Herron & Evans, LLP

(57) ABSTRACT

A pipelined execution unit incorporates one or more low power modes that reduce power consumption by dynamically merging pipeline stages in an execution pipeline together with one another. In particular, the execution logic in successive pipeline stages in an execution pipeline may be dynamically merged together by setting one or more latches that are intermediate to such pipeline stages to a transparent state such that the output of the pipeline stage preceding such latches is passed to the subsequent pipeline stage during the same clock cycle so that both such pipeline stages effectively perform steps for the same instruction during each clock cycle. Then, with the selected pipeline stages merged, the power consumption of the execution pipeline can be reduced (e.g., by reducing the clock frequency and/or operating voltage of the execution pipeline), often with minimal adverse impact on performance.

25 Claims, 10 Drawing Sheets

DYNAMIC MERGING OF PIPELINE STAGES IN AN EXECUTION PIPELINE TO REDUCE POWER CONSUMPTION

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector. The aforementioned techniques may also be combined, resulting in a multithreaded vector execution unit architecture that enables multiple threads to issue SIMD instructions to a vector execution unit to process "vectors" of data points at the same time. In addition, multiple execution units may be used to permit independent operations to be performed in parallel, further increasing overall performance.

The various techniques for improving execution unit performance, however, do not come without a cost. Parallelism adds complexity, often requiring a greater number of logic gates, which increases both the size and the power consumption of such execution units. Coupling these techniques with the general desire to increase performance through other techniques, such as increased switching frequency, the power consumption of complex, high performance execution units continues to increase, despite efforts to reduce such power consumption through process improvements. Excessive power consumption can present issues for portable or battery powered devices, but more typically, excessive power consumption presents issues for nearly all electronic circuits due to the generation of heat, which often requires elaborate cooling systems to ensure that a circuit does not overheat and fail.

Chip-wide control over power consumption is often used in electronic circuits such as those used in laptop computers or other portable devices, typically by throttling down the clock rate or frequency of the circuit to reduce power consumption and the generation of heat. In addition, power consumption may also be reduced in some instances by temporarily shutting down unused circuits on a chip. In all of these instances, however, throttling back the power consumption of the circuit usually results in lower performance in the chip. Furthermore, the circuit characteristics that define the overall power consumption of such circuits, e.g., cycle time, voltage, logic area, capacitance, etc., are most often designed to meet a maximum performance target.

One area where power is often needlessly consumed in an execution unit involves executing dependent instructions. In a typical pipelined execution unit, instructions are operated upon using a series of sequential steps, where the steps are implemented by "stages" of execution logic, so that different stages of the pipeline can be working on one step of a different instruction concurrently. For instance, a typical floating point execution pipeline might be performing a multiply operation for one instruction at the same time it is performing an add for an older instruction and rounding the final result for an even older instruction.

In a typical execution pipeline, the execution logic in each stage is specifically designed to complete the operations it must complete in order to implement a step within the span of a single execution unit clock cycle, so that the output of the stage is available for use by the next stage in the pipeline when the execution unit cycles to its next execution cycle. A set of latches is typically provided before the execution logic in each pipeline stage to latch the input operands (in the case of a first stage in the pipeline) or the results of the previous stage and provide that data as input to the associated execution logic. Therefore, during each cycle, the output of a previous stage is latched into the latches for the next stage, and the latched data is fed as input to the execution logic in the next stage. The output of the execution logic stabilizes prior to the next cycle, while the input data is held in the latches, and when the next cycle occurs, the output is latched by the latches in the next stage so that the data can be processed by the execution logic in the next stage.

As noted above, however, oftentimes some stages of a pipeline are not active due to the absence of a valid instruction at that stage of the pipeline. This may occur for a variety of reasons, but one dominant cause is inter-instruction dependencies, which can occur when a new instruction must be stalled from entering the execution pipeline because an older instruction is still working on producing a result to be used by the newer instruction. For these unused cycles, the associated circuitry/logic for that stage (for instance, an adder in a particular unused cycle) may still undergo a great deal of switching. Furthermore, from the standpoint of power consumption, it is often the latches in a pipeline stage that draw the most power. Consequently, the switching of latches and other circuitry in an invalid pipeline stage is often the source of unneeded power consumption.

Therefore, a need continues to exist in the art for a manner of decreasing the power consumption of pipelined execution units, and in particular, for a manner of decreasing the power consumption of pipelined execution units resulting from inter-instruction dependencies.

SUMMARY OF THE INVENTION

The invention addresses these and other problems associated with the prior art by providing a pipelined execution unit that incorporates one or more low power modes that reduce power consumption by dynamically merging pipeline stages in an execution pipeline together with one another. In particular, the execution logic in successive pipeline stages in an execution pipeline may be dynamically merged together by setting one or more latches that are intermediate to such pipeline stages to a transparent state such that the output of the pipeline stage preceding such latches is passed to the subsequent pipeline stage during the same clock cycle so that both such pipeline stages effectively perform steps for the same instruction during each clock cycle. Then, with selected pipeline stages merged, the power consumption of the execution pipeline can be reduced (e.g., by reducing the clock frequency and/or operating voltage of the execution pipeline). In addition, because the intermediate latch is set to a transparent state, switching of the latch is reduced, thus decreasing the power consumption of the latch.

In one exemplary embodiment, for example, an execution pipeline may include a low power mode whereby the latches in alternate intermediate pipeline stages in the execution pipeline are set to a transparent state, and the clock frequency of the execution pipeline is reduced by approximately one half. With the alternate pipeline stages effectively merged with their immediately preceding pipeline stages, the number of effective stages for the execution pipeline is likewise reduced by approximately one half, so the reduction in clock frequency is effectively offset by the reduction in the number of effective stages, resulting in approximately the same latency for each instruction processed by the execution pipeline. However, with the clock frequency halved, the power consumption of the execution pipeline is likewise reduced approximately by half as well, with the only appreciable penalty in performance being the reduced number of instructions that can be processed in the execution pipeline at the same time. Particularly for certain types of instruction streams where a high percentage of dependent instructions are encountered, and thus a high percentage of bubbles would otherwise exist in the execution pipeline, the reduction in the number of instructions that can be processed by the pipeline at the same time in the low power mode may not have an appreciable adverse impact on performance.

Consistent with one aspect of the invention, a circuit arrangement includes an execution pipeline that is configured to execute instructions using a plurality of pipeline stages, where the plurality of pipeline stages includes a first pipeline stage and a second pipeline stage, the first pipeline stage including a first latch and first execution logic coupled to an output of the first latch and configured to process input data stored in the first latch, and the second pipeline stage including a second latch and second execution logic coupled to an output of the second latch and configured to process input data stored in the second latch, where the second latch is coupled intermediate to the first and second execution logic to latch output data from the first execution logic for use as input data by the second execution logic. The circuit arrangement also includes control logic coupled to the first and second latches and configured to operate in first and second modes, where in the first mode the control logic clocks the first and second latches such that the first and second pipeline stages perform steps for separate instructions in each clock cycle, and in the second mode the control logic sets the second latch to a transparent state to merge the first and second execution logic together such that the first and second pipeline stages perform steps for the same instruction in each clock cycle.

Consistent with another aspect of the invention, a circuit arrangement includes an execution pipeline configured to execute instructions using a plurality of pipeline stages, where each pipeline stage includes a latch and execution logic coupled to an output of such latch and configured to process input data stored in such latch. The circuit arrangement also includes control logic coupled to the execution pipeline. The control logic is configured to, in a first mode, clock the latches in each of the plurality of pipeline stages at a first clock frequency such that the plurality of pipeline stages perform steps for separate instructions in each clock cycle, and in a second mode, clock the latches in a first subset of the plurality of pipeline stages at a second clock frequency that is lower than the first clock frequency, and set the latches in a second subset of the plurality of pipeline stages to a transparent state such that, for each pipeline stage in the second subset of pipeline stages, the execution logic of such pipeline stage is merged with the execution logic of an immediately preceding pipeline stage among the plurality of pipeline stages so that such pipeline stage and immediately preceding pipeline stage perform steps for the same instruction in each clock cycle.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention selectively set latches in the stages of an execution pipeline to a transparent state to dynamically configure the execution pipeline for the purpose of reducing power consumption by the execution pipeline. By setting latches to a transparent stage, the execution logic in the two stages that are otherwise separated by the latches becomes effectively merged so that input data provided to the earlier stage flows through the execution logic of both stages in a single clock cycle. In addition, in many instances, where the combined propagation delay of the merged execution logic exceeds that permitted in a single clock cycle, the frequency of the clock signal provided to the execution pipeline is reduced to accommodate the increased propagation delay.

In general, an execution pipeline consistent with the invention supports multiple modes. In a normal operating mode, the latches in each pipeline stage are all clocked, e.g., at a first clock frequency, such that each stage performs a step for a separate instruction in each clock cycle. In a low power mode, on the other hand, the latches in a first subset of pipeline stages are clocked, but often at a second clock frequency that is lower than the first clock frequency. In addition, the latches in a second subset of pipeline stages are set to a transparent state such that, for each pipeline stage in the second subset of pipeline stages, the execution logic of such pipeline stage is merged with the execution logic of an immediately preceding pipeline stage among the plurality of pipeline stages so that such pipeline stage and immediately preceding pipeline stage perform steps for the same instruction in each clock cycle.

Thus, embodiments consistent with the invention reduce often unneeded power consumption from unnecessary switching during invalid or unused cycles through the use of a reconfigurable execution pipeline. When stage latches are set in the aforementioned transparent state, the execution logic of the adjacent stages is effectively merged into one stage, and due to the reduced number of stages, the pipeline can then switch to a lower clock rate and/or voltage, such that power consumption can be dramatically reduced. Doing so has the potential to cut power consumption dramatically, based on the approximation:

$$P=FCV^2$$

where P is power consumption, F is switching factor, C is capacitance, and V is voltage.

Hardware and Software Environment

Figure 1:
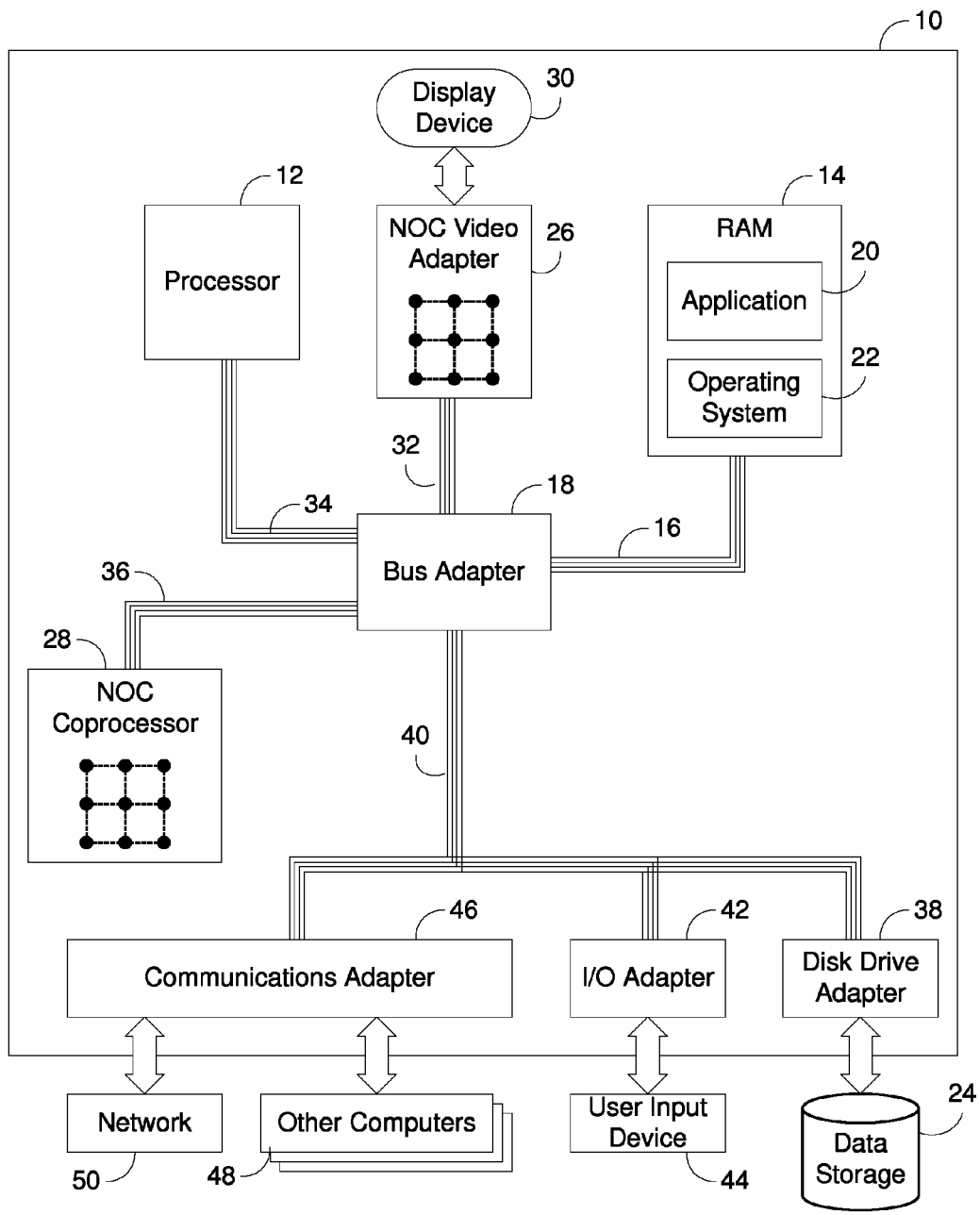
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
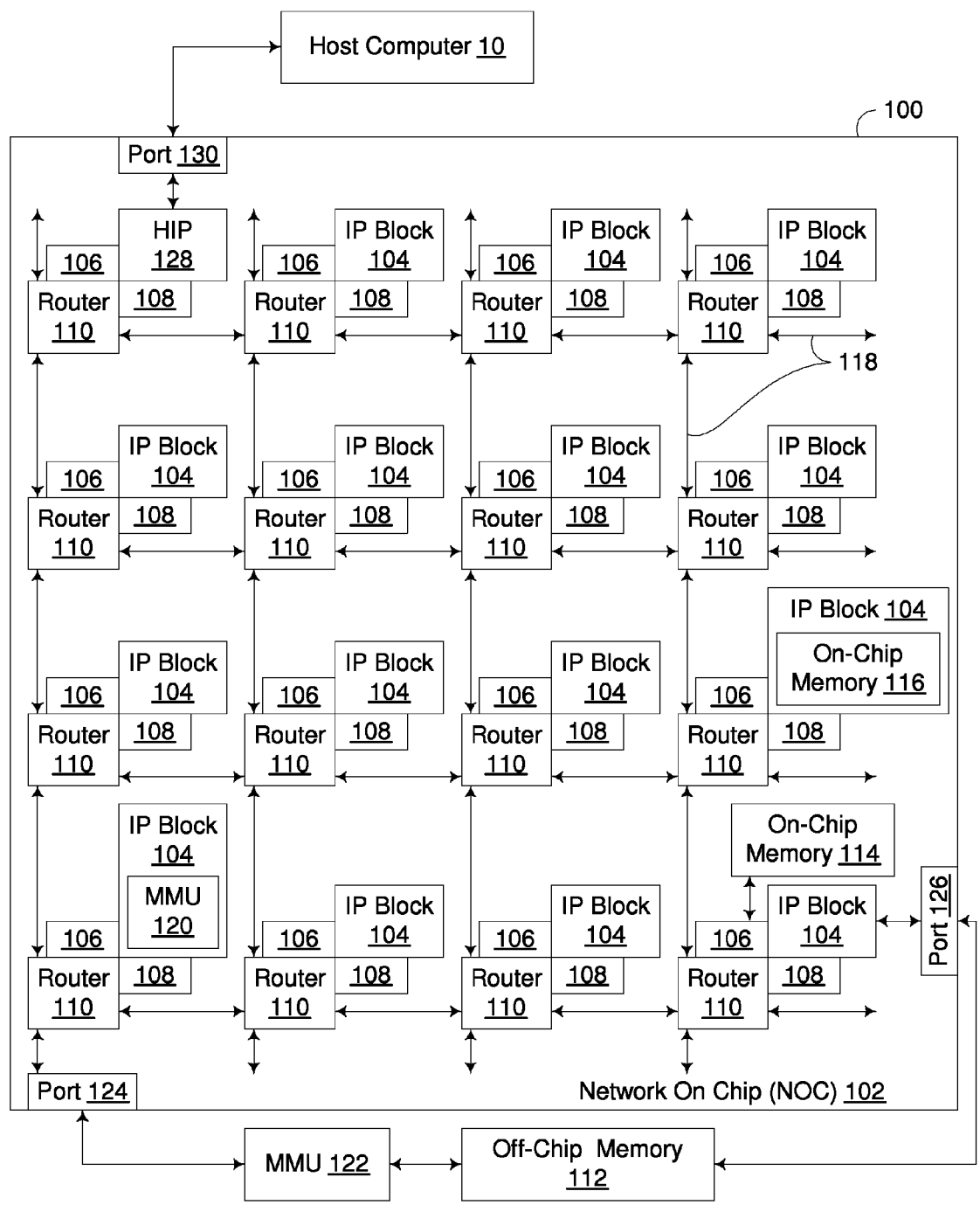
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
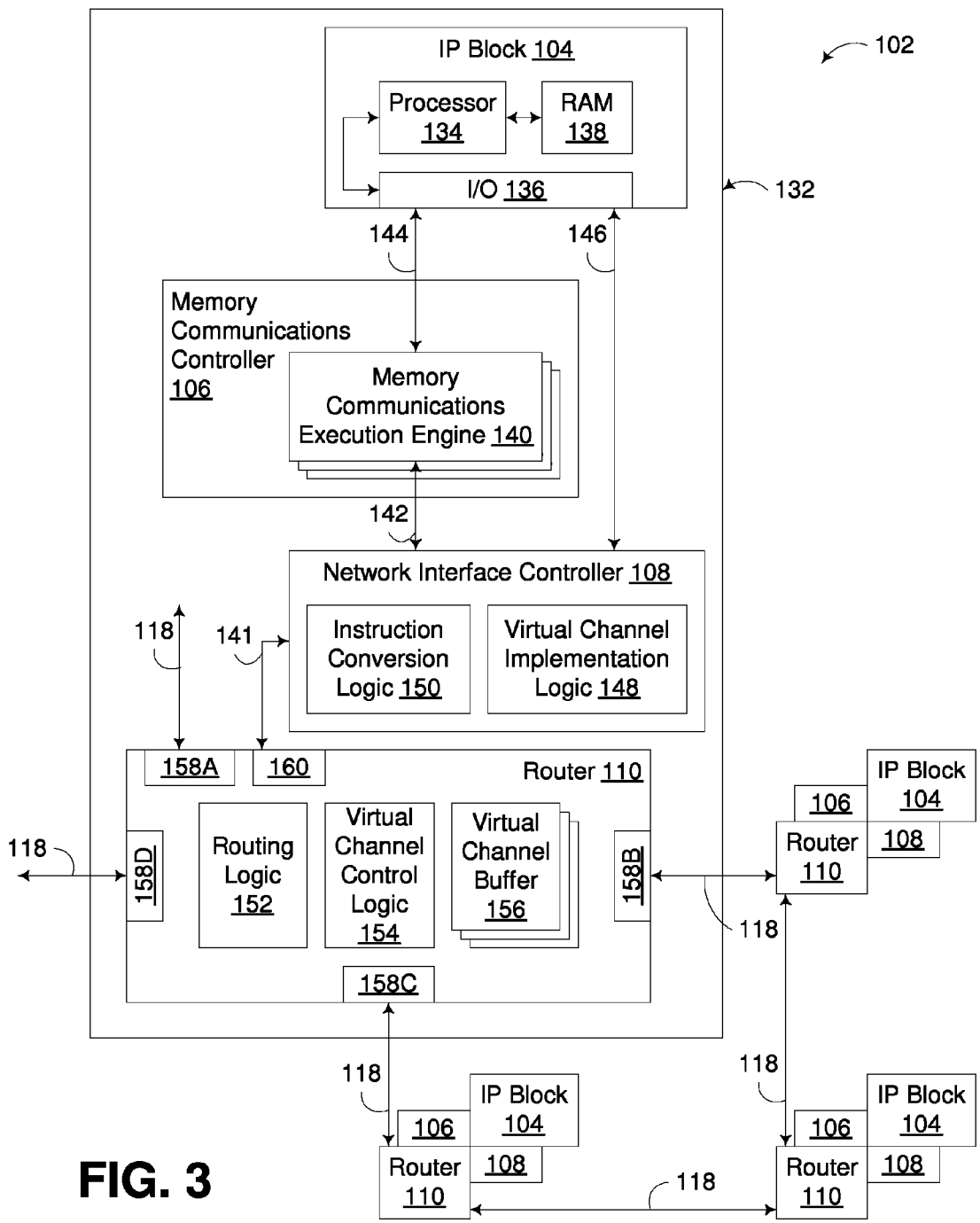
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
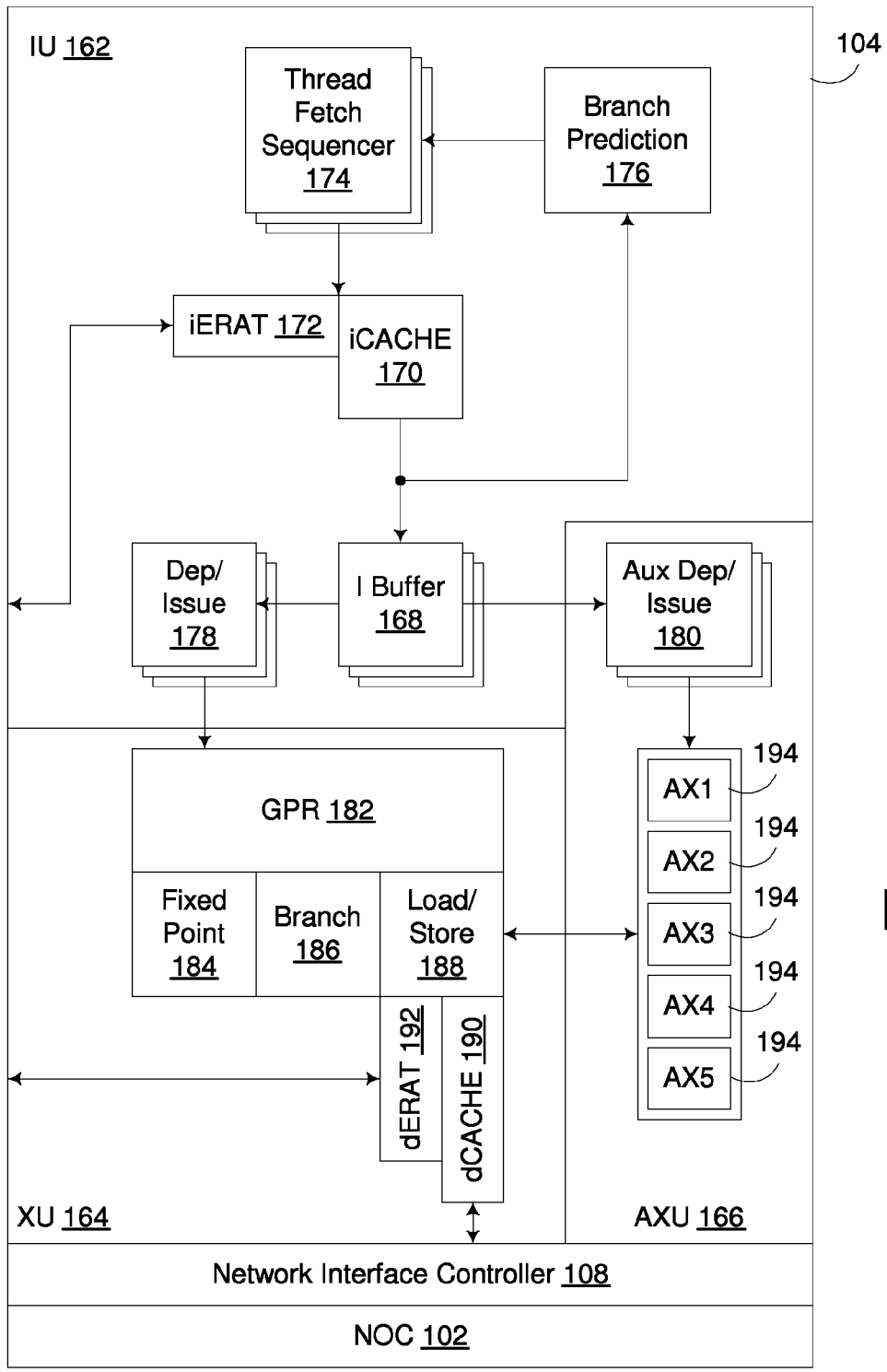
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Dynamically Configurable Execution Pipeline

Figure 5:
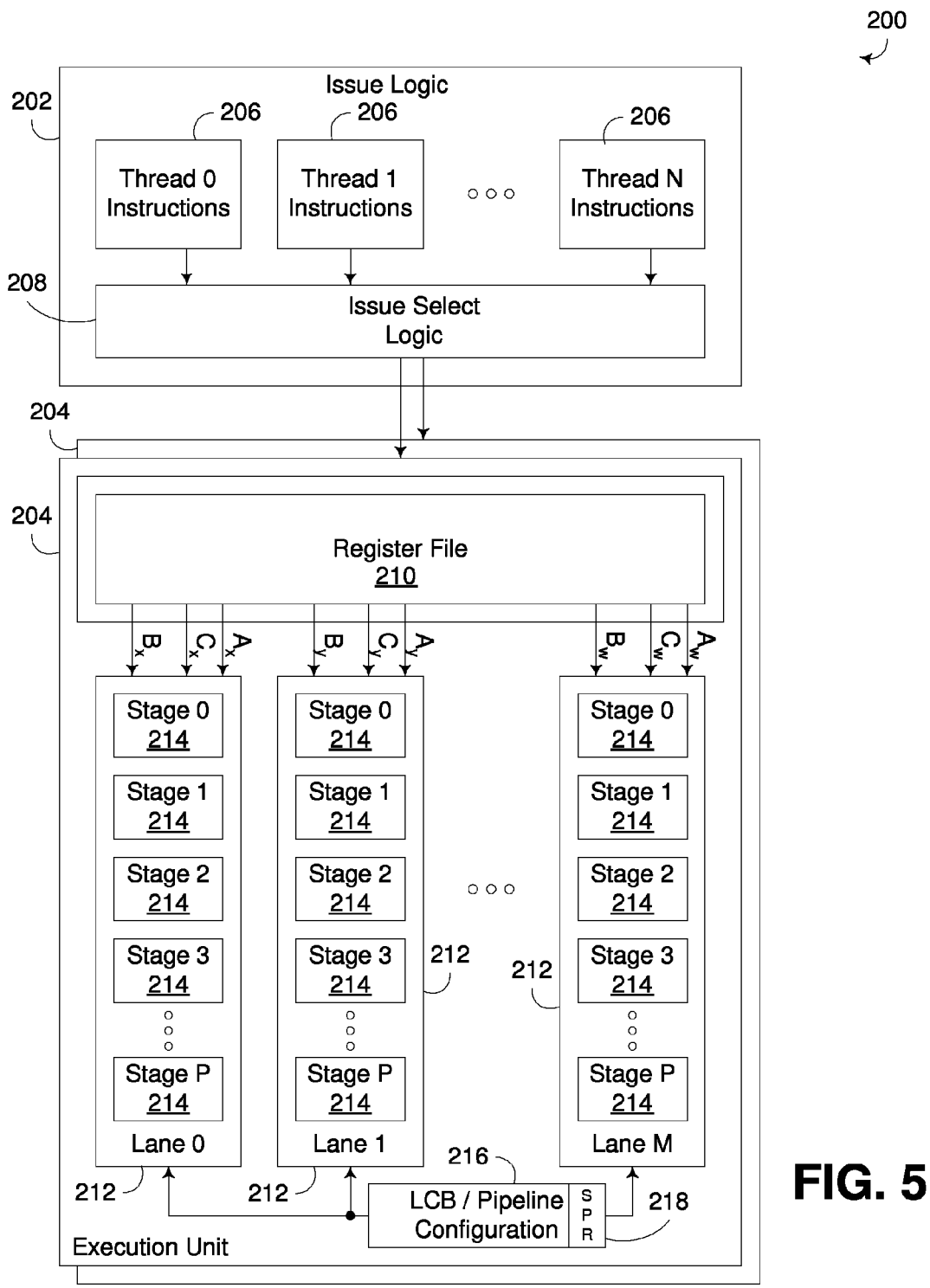
FIG. 5 is a block diagram of a processing unit incorporating a dynamically configurable execution pipeline consistent with the invention, and capable of being implemented within an IP block from the NOC of FIG. 2.

Turning now to FIG. 5, this figure illustrates an exemplary processing unit 200 incorporating a dynamically configurable execution pipeline consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Processing unit 200 includes issue logic 202 that issues instructions to one or more execution units 204. Issue logic 202 includes issue select logic 208 that is capable of issuing instructions from a plurality (N) of threads, illustrated at 206. Issue select logic 208 operates to schedule the issuance of instructions by the various threads, and typically includes logic for managing dependencies between instructions, in a manner generally understood in the art. When multiple execution units 204 are supported, issue select logic 208 is capable of issuing multiple instructions to the multiple execution units each cycle. In some embodiments, however, only one execution unit may be supported, and furthermore, in some embodiments multi-threaded issue of instructions may not be supported.

Each execution unit 204 processes instructions issued to the execution unit by issue logic 202, and includes a register file 210 coupled to a plurality (M) of processing lanes or sub-units 212 capable of processing data stored in register file 210 based upon the instructions issued by issue logic 202, and storing target data back to the register file. A number of different register file architectures may be used consistent with the invention, e.g., using 128 quadword (128b) vector registers, or any different number and/or differently sized vector registers as appropriate. Each execution unit 204 may be implemented as a number of different types of execution units, e.g., floating point units, fixed point units, or specialized execution units such as graphics processing units, encryption/decryption units, coprocessors, XML processing units, etc., and may be implemented either as vector or scalar-based units. In addition, an execution unit 204 may include only a single processing lane in some embodiments.

In the illustrated embodiment, each processing lane 212 defines an execution pipeline that includes a plurality (P) of pipeline stages 214. In the illustrated embodiment, each such execution pipeline is dynamically configurable such that selected pipeline stages are capable of being dynamically merged together, and so that the power consumption of the pipeline (e.g., via control over execution cycle and/or operating voltage) can be reduced. Control over each pipeline is provided by control logic implemented via a pipeline configuration block 216, which in the illustrated embodiment is combined with a local clock buffer (LCB). Furthermore, in the illustrated embodiment, a special purpose register (SPR) 218 is implemented in pipeline configuration block 216 to provide a software accessible manner of controlling the mode of operation for each pipeline.

It will be appreciated that in some embodiments, each pipeline may be configured separately, or all pipelines can be configured collectively to operate in the same mode. In addition, more than one low power mode may be available in some embodiments. Moreover, it will be appreciated that various other manners of setting the mode of operation of a pipeline may be used in lieu of a special purpose register. For example, rather than setting mode via software, the mode may be set based upon runtime analysis of the instruction stream, e.g., to identify instruction sequences where dependencies exist and where little or no performance penalty would be incurred from transitioning to a lower power mode. Other manners of setting the mode of operation may be used in the alternative.

Figure 6:
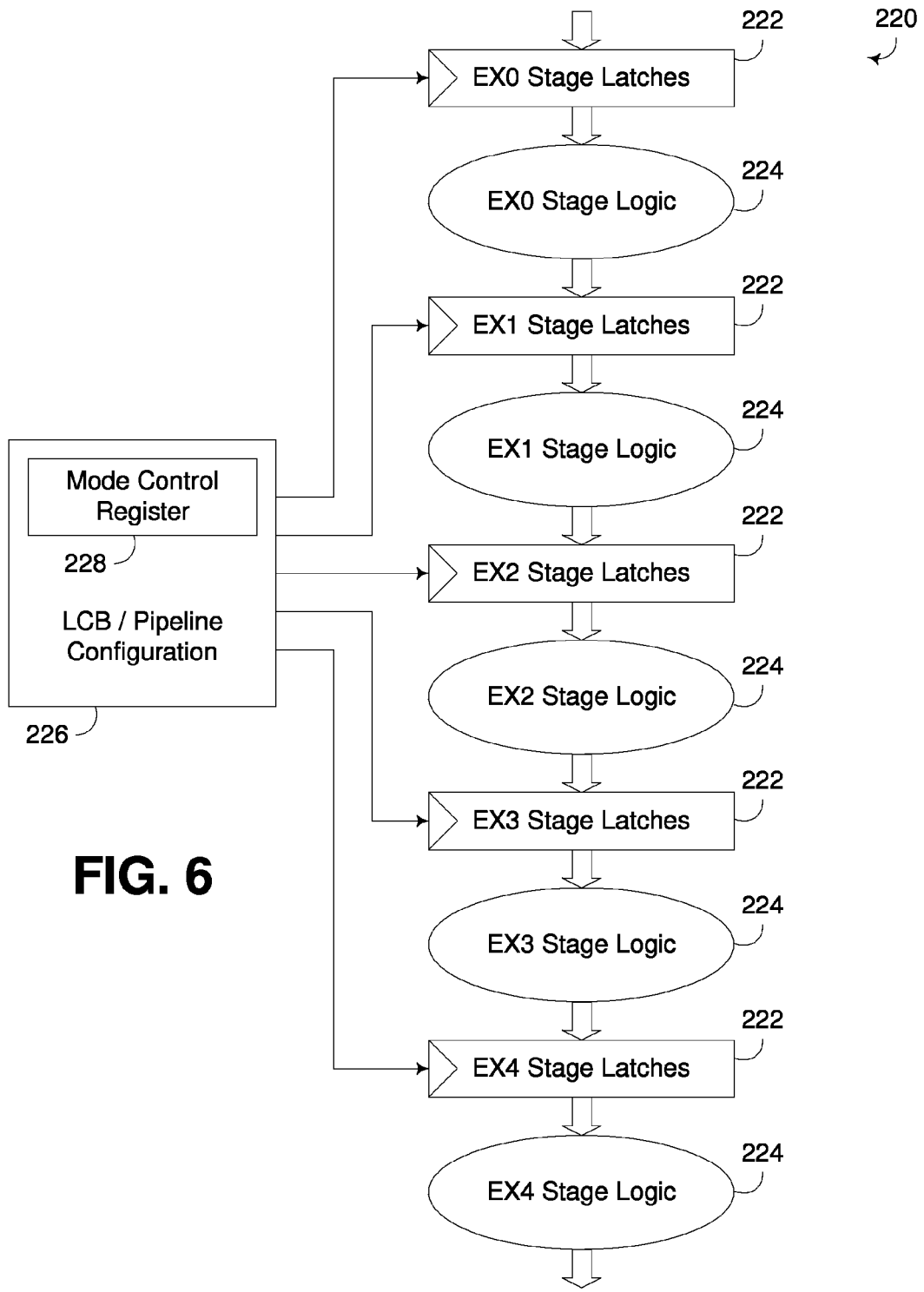
FIG. 6 is a block diagram of an exemplary implementation of an execution pipeline suitable for use in the processing unit of FIG. 5.

FIG. 6 illustrates an exemplary implementation of a dynamically configurable execution pipeline 220 capable of being implemented in processing unit 200. In this implementation, a set of pipeline execution stages, denoted EX0-EX4, are illustrated, with each such stage EX0-EX4 including a set of stage latches 222 and execution logic 224. It will be appreciated that an execution pipeline may include greater or fewer numbers of stages, and that, for example, additional stages may be included before or after the stages illustrated in FIG. 6.

In general, each set of stage latches 222 typically includes one or more latches to temporarily store input data to be processed by the associated execution logic 224 for a particular stage. In addition, the execution logic 224 in each stage may be configured to perform any number of operations in association with executing an instruction in the execution pipeline. For example, where execution pipeline 220 is used in a floating point unit, execution logic 224 may include multiplier logic, adder logic, divider logic, rounding logic, normalizing logic, aligning logic, etc.

To implement dynamic configurability of pipeline 220, control logic implemented as a pipeline configuration block 226 is coupled to each set of stage latches 222. A software accessible SPR, referred to as a mode control register 228, is used to control the operating mode of the pipeline to operate in either a normal, full power mode, or in one or more low power modes. In addition, in this embodiment the pipeline configuration block 226 also operates as a local clock buffer, taking a global clock signal and buffering and repowering the clock signal, and further reducing the frequency of the clock signal depending upon the state of mode control register 228.

Figure 7:
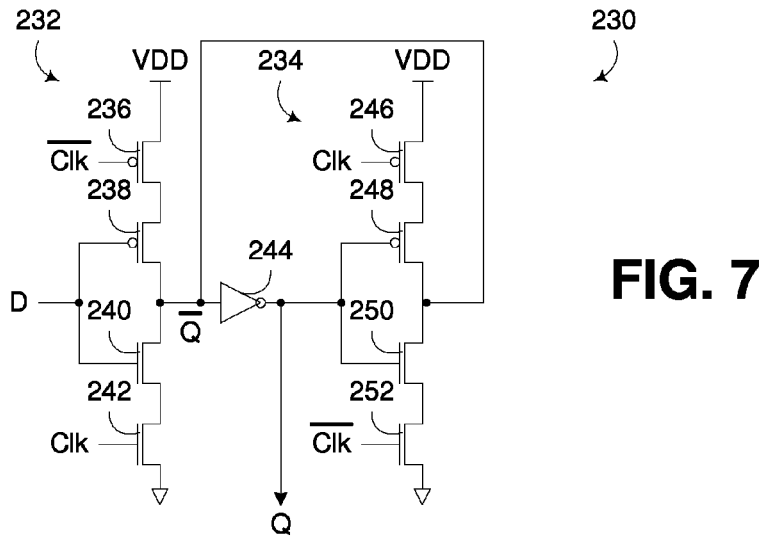
FIG. 7 is a block diagram of an exemplary implementation of a latch used in the execution pipeline of FIG. 6.

While a number of different latch implementations may be used consistent with the invention, FIG. 7 illustrates one exemplary "D" style latch implementation 230 including a data input D, active low and active high data outputs $\overline{Q}$ and Q, and active low and active high clock inputs $\overline{Clk}$ and Clk. A first branch of gates 232 includes a pair of PFET's 236, 238 coupled in series to VDD, and coupled to ground through a pair of NFET's 240, 242. The data input D is coupled to the gate inputs of PFET 238 and NFET 240, while the active low clock input $\overline{Clk}$ is coupled to the gate input of PFET 236 while the active high clock input Clk is coupled to the gate input of NFET 242. The active low data output $\overline{Q}$ is defined at the junction of PFET 238 and NFET 240, and is coupled to an inverter 244, the output of which generates the active high data output Q. A second branch of gates 234 includes a pair of PFET's 246, 248 coupled in series to VDD, and coupled to ground through a pair of NFET's 250, 252. The active high data output Q is coupled to the gate inputs of PFET 248 and NFET 250, while the active high clock input Clk is coupled to the gate input of PFET 246 while the active low clock input $\overline{Clk}$ is coupled to the gate input of NFET 252. Feedback is provided from the common junction between PFET 248 and NFET 250 to the active low data output node $\overline{Q}$.

So configured, latch 230 is configured to pass a value at the data input D to the active high data output Q responsive to the clock input Clk being driven to a first logic state (a logic "1"), latch the value at the data input D responsive to the clock input Clk being transitioned from the first logic state to a second logic state (a logic "0"), and output the latched value to the data output Q responsive to the clock input being driven to the second logic state. Put another way, when Clk=0, Q=Qprev, where Qprev is the value of Q when Clk transitioned from 1 to 0. But if Clk=1, then Q=D.

The mode where Q=D is often referred to as a "flush through" or "transparent" state, since the value at the D data input is simply passed to the data output Q. Consequently, in the illustrated embodiment, sets of stage latches may be transitioned into a transparent state simply by holding the Clk inputs thereof at logic 1.

Figure 8:
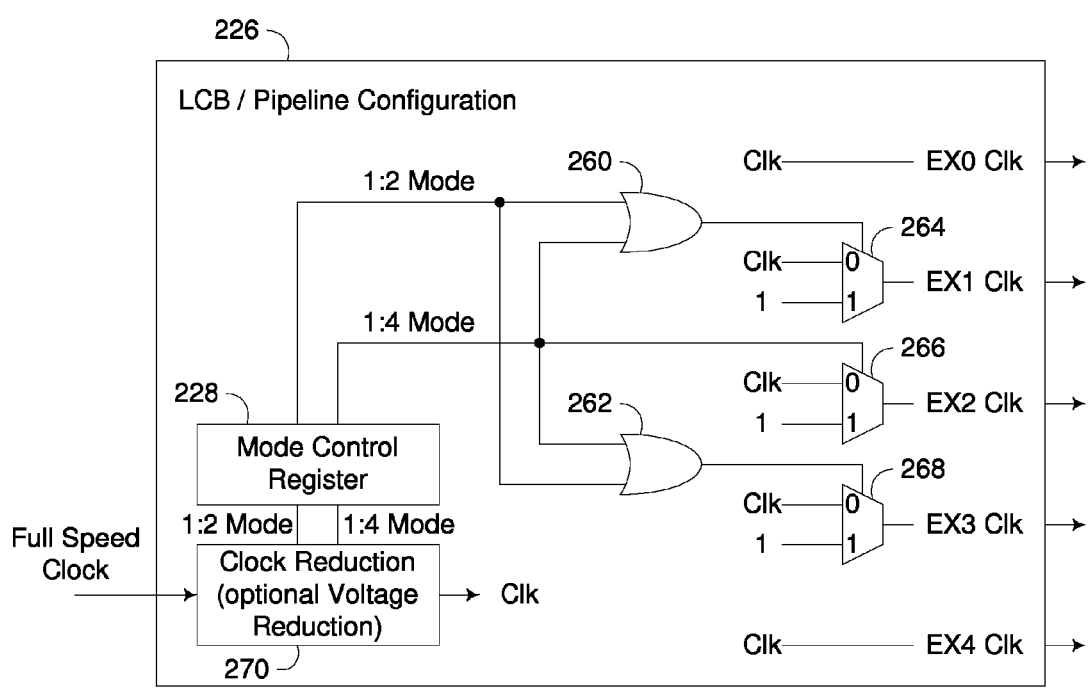
FIG. 8 is a block diagram of an exemplary implementation of the local clock buffer/pipeline configuration logic referenced in FIG. 6.

Generation of the Clk signal used to control the sets of stage latches 222 in execution pipeline 220 is provided by pipeline configuration block 226, which is shown in greater detail in FIG. 8.

In this implementation, a normal operating mode is supported along with two low power modes, referred to herein as 1:2 and 1:4 modes. Mode configuration is provided by SPR 228, which outputs 1:2 mode and 1:4 mode selection signals based upon the mode configured in SPR 228. Each of the 1:2 and 1:4 mode selection signals is provided as an input to a pair of OR gates 260, 262. OR gate 260 outputs a select signal to a multiplexer 264, while OR gate 262 outputs a select signal to a multiplexer 268. The 1:4 mode selection signal is also used as the select signal for a multiplexer 266. For each of multiplexers 264, 266, 268, the input that is passed to the output when the select signal is not asserted is tied to the Clk clock signal, while the input that is passed to the output when the select signal is asserted is tied to a logic "1" value.

As noted above, block 226 also serves as a local clock buffer (LCB), and as such, includes clock reduction logic 270 that receives a global, full speed clock, and outputs the Clk clock signal. In the illustrated embodiment, clock reduction logic 270 is configured to either pass the full speed clock to the Clk clock signal when in a normal operating mode, or pass a reduced frequency clock signal to the Clk clock signal when in either of the 1:2 or 1:4 modes. In this embodiment, when in the 1:2 mode, the frequency clock signal output by logic 270 is reduced to about one half of the full speed clock, while when in the 1:4 mode, the frequency clock signal output by logic 270 is reduced to about one fourth of the full speed clock. Various known manners of generating a reduced frequency clock signal from a full speed clock signal may be used consistent with the invention.

The Clk clock signal is used to gate each of the sets of latches 222 for each pipeline stage EX0-EX4 of execution pipeline 220 (FIG. 6). The Clk clock signal is passed directly to the EX0 and EX4 sets of latches, while the clock inputs for the EX1, EX2 and EX3 sets of latches (which are intermediate latches from the perspective of the pipeline) are coupled to the outputs of multiplexers 264, 266 and 268, respectively.

In alternate embodiments, pipeline configuration block 226 may include other mechanism for lowering power consumption for the pipeline. For example, reduced operating voltage for the pipeline may be utilized in a low power mode, either in combination with or in lieu of a reduced clock frequency. Other power reduction techniques may also be used in other embodiments. In addition, it is noted that the generation of the active low $\overline{Clk}$ clock signal is not shown in FIG. 8 to simplify the illustration, and may be implemented within block 270, individually within each latch, or in a separate circuit intermediate the two.

Figure 9:
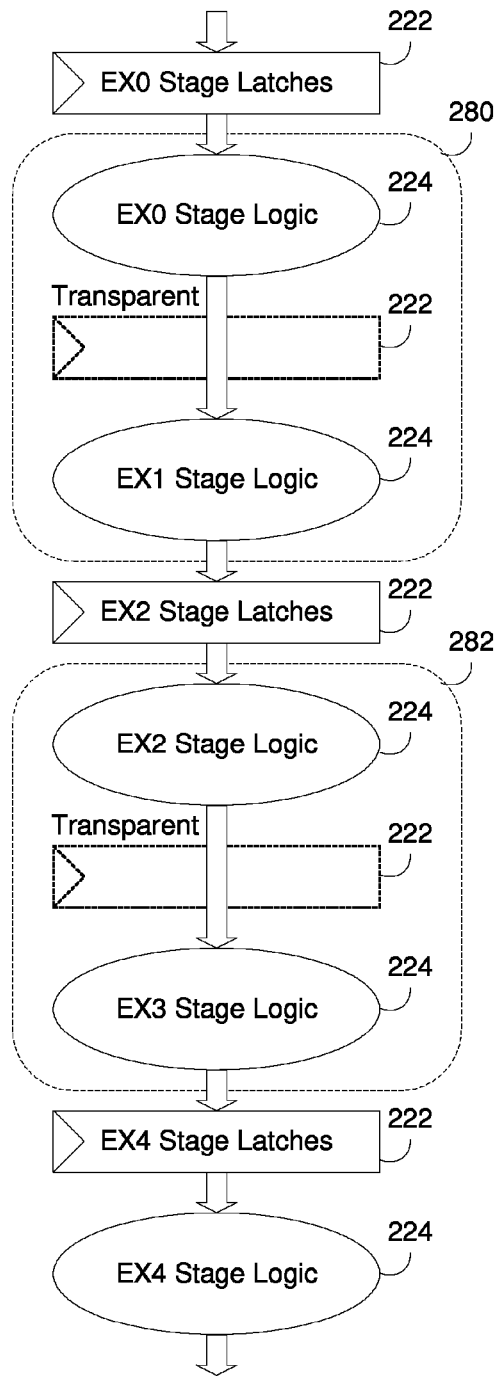
FIG. 9 is a block diagram of the execution pipeline of FIG. 6 when configured in a 1:2 mode.

FIG. 9 illustrates the configuration of pipeline 220 when in the 1:2 mode. In particular, in this mode, the EX1 and EX3 sets of stage latches 222 are set to a transparent state via multiplexers 264, 268 (FIG. 8), while the EX0, EX2 and EX4 sets of stage latches 222 are clocked by the Clk clock signal. This effectively merges the EX0 and EX1 stage execution logic 224 into one stage, as illustrated at 280. Likewise, the EX2 and EX3 state execution logic 224 is effectively merged into one stage, as illustrated at 282. Due to the reduced number of stages, the execution logic will take longer to transition to its final correct result state, so the clock rate for the pipeline in this mode is desirably reduced, e.g., to about half of its original rate, or in some instances almost one half the original rate. Additionally (or alternatively) the voltage may also be reduced. By doing so, power consumption may be reduced to less than half of the original power consumption of the pipeline, based on the approximation $P=F C V^2$.

Of note, when execution pipeline 220 is in the normal operating mode, each stage EX0-EX4 performs a step in the execution of a different instruction in each clock cycle. In contrast, when in the 1:2 mode, where the EX0 and EX1 stages are merged, the EX0 and EX1 stages perform steps for the same instruction in each clock cycle. Likewise, the EX2 and EX3 stages, when merged, perform steps for the same instruction in each clock cycle.

Figure 10:
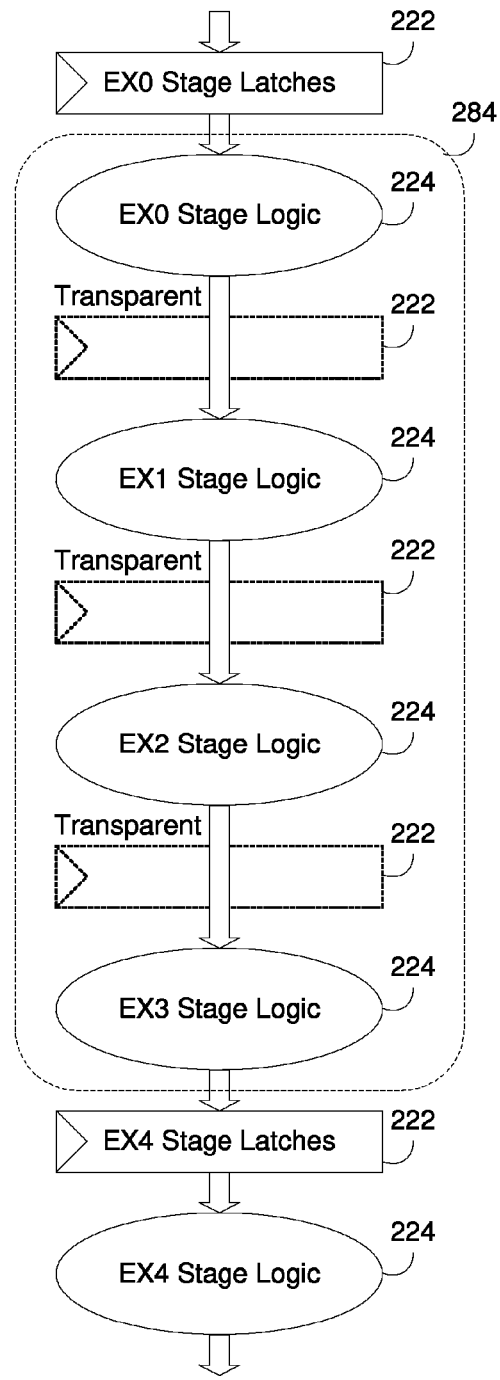
FIG. 10 is a block diagram of the execution pipeline of FIG. 6 when configured in a 1:4 mode.

FIG. 10 similarly illustrates the configuration of pipeline 220 when in the 1:4 mode. In particular, in this mode, the EX1, EX2 and EX3 sets of stage latches 222 are set to a transparent state via multiplexers 264, 266, and 268 (FIG. 8), while the EX0 and EX4 sets of stage latches 222 are clocked by the Clk clock signal. This effectively merges the EX0, EX1, EX2 and EX3 state execution logic 224 into one stage, as illustrated at 284. Again, due to the reduced number of stages, the execution logic will take longer to transition to its final correct result state, so the clock rate for the pipeline in this mode is desirably reduced, e.g., to about fourth of its original rate, or in some instances almost one fourth the original rate. Additionally (or alternatively) the voltage may also be reduced. By doing so, power consumption may be reduced to less than one fourth of the original power consumption of the pipeline, based on the approximation $P=F C V^2$.

The illustrated implementation has the advantage of having basically the same overall pipeline latency between modes, yet lower power consumption, with the primary drawback being that fewer instructions can be in execution stages at the same time. This problem, however, is minimized for certain types of instruction streams, e.g., a long stream of inter-dependant instructions where several stall cycles would normally exist. With fewer pipeline stages, the dependency and issue logic may not need to stall as many instructions, or if so, would not need to stall such instructions for as many execution cycles.

Figure 11:
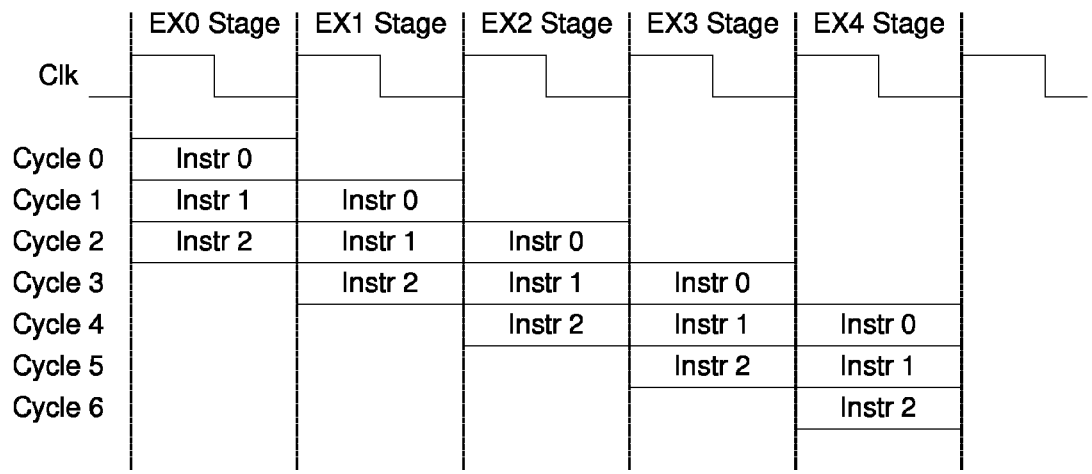
FIG. 11 is a timing diagram illustrating the sequential execution of three exemplary instructions by the execution pipeline of FIG. 6 when configured in a normal operating mode.
Figure 12:
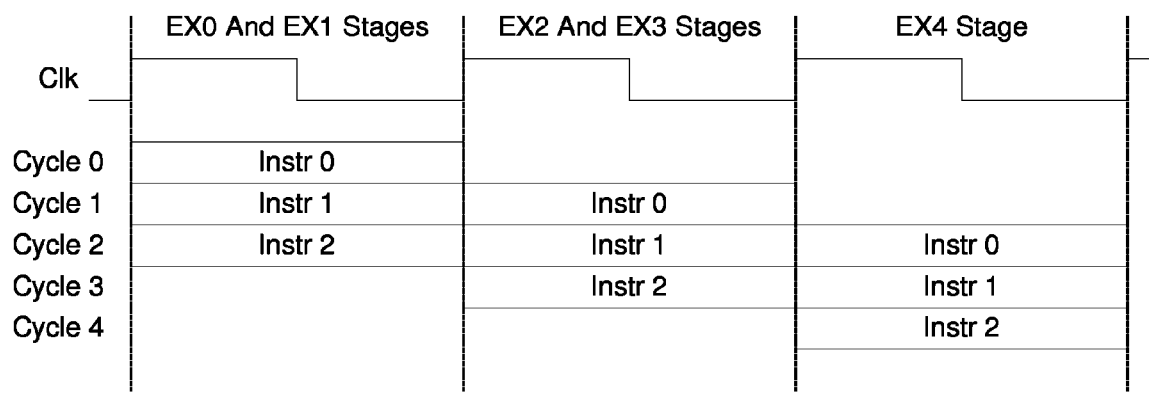
FIG. 12 is a timing diagram illustrating the sequential execution of three exemplary instructions by the execution pipeline of FIG. 6 when configured in a 1:2 mode.
Figure 13:
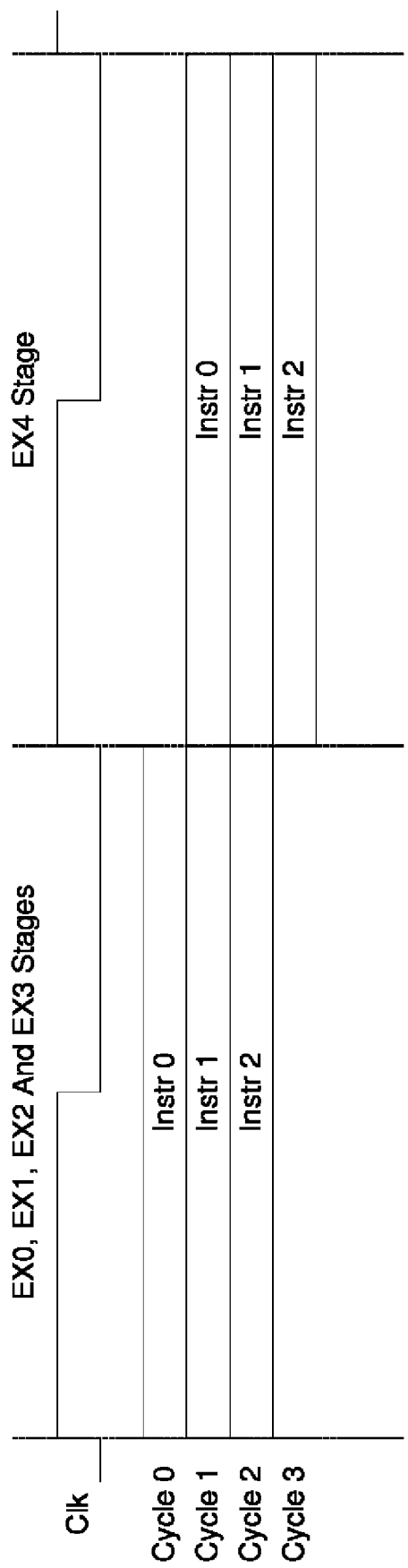
FIG. 13 is a timing diagram illustrating the sequential execution of three exemplary instructions by the execution pipeline of FIG. 6 when configured in a 1:4 mode.

As an example, FIGS. 11-13 illustrate the sequential execution of three instructions (instructions 0, 1 and 2) by execution pipeline 220 when normal, 1:2 and 1:4 operating modes, respectively. For ease of explanation, no inter-instruction dependencies are shown between the instructions. As shown in FIG. 11, when in a normal operating mode, a full speed Clk clock signal is provided, where each instruction passes sequentially through pipeline stages EX0-EX4 in five full speed clock cycles, for a total of seven cycles to execute all three instructions.

As shown in FIG. 12, when in a 1:2 operating mode, a half speed Clk clock signal may be provided, and during each half speed clock cycle, each instruction passes first through the merged EX0 and EX1 stages, and then through the merged EX2 and EX3 stages. In addition, in a third half speed clock cycle, the instruction is shown passing through the EX4 stage. In many embodiments, however, additional stages, which are not illustrated herein, may be provided in execution pipeline 220, so the EX4 stage may be merged with another stage. Of note, each instruction passes through the same pipeline stages in three half speed clock cycles, for a total of five half speed cycles to execute all three instructions. Furthermore, with respect to the EX0-EX3 stages, the overall latency for each instruction to pass through all four stages is essentially the same in the 1:2 mode as in the normal operating mode.

As shown in FIG. 13, when in a 1:4 operating mode, a quarter speed Clk clock signal may be provided, and during a single quarter speed clock cycle, each instruction passes through the merged EX0, EX1, EX2 and EX3 stages. In addition, in a second quarter half speed clock cycle, the instruction is shown passing through the EX4 stage. In many embodiments, however, additional stages, which are not illustrated herein, may be provided in execution pipeline 220, so the EX4 stage may be merged with one or more other stages. Of note, each instruction passes through the same pipeline stages in two quarter speed clock cycles, for a total of four quarter speed cycles to execute all three instructions. Furthermore, with respect to the EX0-EX3 stages, the overall latency for each instruction to pass through all four stages is essentially the same in the 1:4 mode as in the normal operating mode.

It will be appreciated that a wide variety of alternate designs may be used to dynamically configure an execution pipeline without departing from the spirit and scope of the invention. For example, other manners of setting stage latches to a transparent state may be used, e.g., via a control signal separate from the clock signal, or via gating the clock signal in response to a control signal. In addition, a clock signal may be reduced globally rather than locally. Furthermore, other power reduction technologies, e.g., reduced operating voltage, may be used in lieu of or in addition to reducing the clock frequency.

It will also be appreciated that rather than setting stage latches in every other intermediate stage to transparent mode (as in the aforementioned 1:2 mode) or setting every stage latches in every three out of four intermediate stages to transparent mode (as in the aforementioned 1:4 mode), stage latches may be controlled in other manners to dynamically merge various combinations of stages together. For example, the execution logic in some pipeline stages may have a greater or lower propagation delay than other pipeline stages, and thus considerations regarding the combined propagation delay of some pipeline stages may affect which stage latches are set to a transparent state in a low power mode. For example, for a seven stage pipeline, the first two and last two stages may have combined propagation delays that match the combined propagation delay of the middle three stages, and as such it may be desirable to merge the pipeline stages in a 2-3-2 pattern to optimize pipeline performance in a low power mode.

In addition, any number of separate low power modes may be supported. Furthermore, various manners of dynamically switching modes in response to different stimulus may be used. For example, switching between normal and low power operating modes may be performed by software, e.g., either an operating system or kernel (e.g., based upon the type of task, system setting, power management setting), or even by an application. In other embodiments, hardware-based dynamic monitoring may be used to detect when inter-instruction dependencies are or will be encountered so that a pipeline can be configured in a low power mode with little loss in performance.

Other modifications will be apparent to one of ordinary skill having the benefit of the instant disclosure. Therefore, the invention lies in the claims hereinafter appended.

What is claimed is:

1. A circuit arrangement, comprising:
an execution pipeline configured to execute instructions using a plurality of pipeline stages, the plurality of pipeline stages including a first pipeline stage and a second pipeline stage, the first pipeline stage including a first latch and first execution logic coupled to an output of the first latch and configured to process input data stored in the first latch, and the second pipeline stage including a second latch and second execution logic coupled to an output of the second latch and configured to process input data stored in the second latch, wherein the second latch is coupled intermediate to the first and second execution logic to latch output data from the first execution logic for use as input data by the second execution logic, and wherein the first latch is configured to be powered by a power supply signal and clocked by a clock signal; and
control logic coupled to the first and second latches and configured to operate in first and second modes, wherein in the first mode the control logic clocks the first and second latches such that the first and second pipeline stages perform steps for separate instructions in each clock cycle, and in the second mode the control logic sets the second latch to a transparent state to merge the first and second execution logic together such that the first and second pipeline stages perform steps for the same instruction in each clock cycle, wherein the control logic is further configured to reduce a clock frequency of the clock signal used to clock the first latch or a voltage of the power supply signal that powers the first latch when in the second mode.

2. The circuit arrangement of claim 1, wherein the control logic is further configured to clock the first latch at a reduced clock frequency relative to that of the first mode when in the second mode.

3. The circuit arrangement of claim 1, wherein the control logic is further configured to reduce an operating voltage for the execution pipeline when in the second mode.

4. The circuit arrangement of claim 1, wherein the plurality of pipeline stages includes a third pipeline stage including a third latch and third execution logic coupled to an output of the third latch and configured to process input data stored in the third latch, wherein the third latch is coupled intermediate to the second and third execution logic to latch output data from the second execution logic for use as input data by the third execution logic.

5. The circuit arrangement of claim 4, wherein the control logic is coupled to the third latch and configured to:
in the first mode, clock the first, second and third latches such that the first, second and third pipeline stages perform steps for separate instructions in each clock cycle; and
in the second mode, set the second and third latches to a transparent state to merge the first, second and third execution logic together such that the first, second and third pipeline stages perform steps for the same instruction in each clock cycle.

6. The circuit arrangement of claim 4, wherein the control logic is coupled to the third latch and configured to:
in the first mode, clock the first, second and third latches such that the first, second and third pipeline stages perform steps for separate instructions in each clock cycle;
in the second mode, clock the first and third latches and set the second latch to a transparent state to merge the first and second execution logic together such that the first and second pipeline stages perform steps for the same instruction in each clock cycle and the third pipeline stage performs a step for a separate instruction from the first and second pipeline stages in each clock cycle; and
in a third mode, set the second and third latches to a transparent state to merge the first, second and third execution logic together such that the first, second and third pipeline stages perform steps for the same instruction in each clock cycle.

7. The circuit arrangement of claim 1, wherein the control logic is configured to, in the second mode, set latches for every other intermediate pipeline stage to a transparent state and reduce a clock frequency at which the execution pipeline is clocked to about one half of a clock frequency at which the execution pipeline is clocked when the control logic is in the first mode.

8. The circuit arrangement of claim 1, wherein the control logic is configured to, in the second mode, set latches for every three out of four intermediate pipeline stages to a transparent state and reduce a clock frequency at which the execution pipeline is clocked to about one fourth of a clock frequency at which the execution pipeline is clocked when the control logic is in the first mode.

9. The circuit arrangement of claim 1, wherein the control circuit comprises a local clock buffer circuit.

10. The circuit arrangement of claim 1, wherein the control circuit is configured to set the second latch to the transparent state by gating a clock input to the second latch.

11. The circuit arrangement of claim 1, wherein the second latch includes a data input, a data output and a clock input, wherein the second latch is configured to pass a value at the data input to the data output responsive to the clock input being driven to a first logic state, to latch a value at the data input responsive to the clock input being transitioned from the first logic state to a second logic state, and to output the latched value to the data output responsive to the clock input being driven to the second logic state, and wherein the control circuit is configured to set the second latch to the transparent state by holding the clock input of the second latch in the first logic state.

12. The circuit arrangement of claim 1, wherein the control logic is configured to operate in the first or second mode responsive to a software accessible special purpose register.

13. An integrated circuit device including the circuit arrangement of claim 1.

14. A program product comprising a computer readable non-transitory storage medium and logic definition program code resident on the computer readable medium and defining the circuit arrangement of claim 1.

15. A circuit arrangement, comprising:
an execution pipeline configured to execute instructions using a plurality of pipeline stages, each pipeline stage including a latch and execution logic coupled to an output of such latch and configured to process input data stored in such latch; and
control logic coupled to the execution pipeline, wherein the control logic is configured to:
in a first mode, clock the latches in each of the plurality of pipeline stages at a first clock frequency such that the plurality of pipeline stages perform steps for separate instructions in each clock cycle; and
in a second mode, reduce a clock frequency of a clock signal supplied to the latches in a first subset of the plurality of pipeline stages to clock the latches in the first subset of the plurality of pipeline stages at a second clock frequency that is lower than the first clock frequency, and set the latches in a second subset of the plurality of pipeline stages to a transparent state such that, for each pipeline stage in the second subset of pipeline stages, the execution logic of such pipeline stage is merged with the execution logic of an immediately preceding pipeline stage among the plurality of pipeline stages so that such pipeline stage and immediately preceding pipeline stage perform steps for the same instruction in each clock cycle.

16. A method of executing instructions in an execution unit of the type including an execution pipeline with a plurality of pipeline stages, wherein the plurality of pipeline stages includes a first pipeline stage and a second pipeline stage, wherein the first pipeline stage includes a first latch and first execution logic coupled to an output of the first latch and configured to process input data stored in the first latch, and the second pipeline stage includes a second latch and second execution logic coupled to an output of the second latch and configured to process input data stored in the second latch, wherein the second latch is coupled intermediate to the first and second execution logic to latch output data from the first execution logic for use as input data by the second execution logic, and wherein the first latch is configured to be powered by a power supply signal and clocked by a clock signal, the method comprising:
operating the execution pipeline in a first mode by clocking the first and second latches such that the first and second pipeline stages perform steps for separate instructions in each clock cycle; and
operating the execution pipeline in a second mode by setting the second latch to a transparent state to merge the first and second execution logic together such that the first and second pipeline stages perform steps for the same instruction in each clock cycle, wherein operating the execution pipeline in the second mode includes reducing a clock frequency of the clock signal used to clock the first latch or a voltage of the power supply signal that powers the first latch when in the second mode.

17. The method of claim 16, wherein operating the execution pipeline in the second mode includes clocking the first latch at a reduced clock frequency relative to that for the first mode.

18. The method of claim 16, wherein operating the execution pipeline in the second mode includes reducing an operating voltage for the execution pipeline.

19. The method of claim 16, wherein the plurality of pipeline stages includes a third pipeline stage including a third latch and third execution logic coupled to an output of the third latch and configured to process input data stored in the third latch, wherein the third latch is coupled intermediate to the second and third execution logic to latch output data from the second execution logic for use as input data by the third execution logic, and wherein:

operating the execution pipeline in the first mode includes clocking the first, second and third latches such that the first, second and third pipeline stages perform steps for separate instructions in each clock cycle; and operating the execution pipeline in the second mode includes setting the second and third latches to a transparent state to merge the first, second and third execution logic together such that the first, second and third pipeline stages perform steps for the same instruction in each clock cycle.

20. The method of claim 16, wherein the plurality of pipeline stages includes a third pipeline stage including a third latch and third execution logic coupled to an output of the third latch and configured to process input data stored in the third latch, wherein the third latch is coupled intermediate to the second and third execution logic to latch output data from the second execution logic for use as input data by the third execution logic, and wherein:

operating the execution pipeline in the first mode includes clocking the first, second and third latches such that the first, second and third pipeline stages perform steps for separate instructions in each clock cycle;

operating the execution pipeline in the second mode includes clocking the first and third latches and setting the second latch to a transparent state to merge the first and second execution logic together such that the first and second pipeline stages perform steps for the same instruction in each clock cycle and the third pipeline stage performs a step for a separate instruction from the first and second pipeline stages in each clock cycle; and the method further comprises operating the execution pipeline in a third mode by setting the second and third latches to a transparent state to merge the first, second and third execution logic together such that the first, second and third pipeline stages perform steps for the same instruction in each clock cycle.

21. The method of claim 16, wherein operating the execution pipeline in the second mode includes setting latches for every other intermediate pipeline stage to a transparent state and reducing a clock frequency at which the execution pipeline is clocked to about one half of a clock frequency at which the execution pipeline is clocked when the execution pipeline is operated in the first mode.

22. The method of claim 16, wherein operating the execution pipeline in the second mode includes setting latches for every three out of four intermediate pipeline stages to a transparent state and reducing a clock frequency at which the execution pipeline is clocked to about one fourth of a clock frequency at which the execution pipeline is clocked when the execution pipeline is operated in the first mode.

23. The method of claim 16, wherein setting the second latch to the transparent state includes gating a clock input to the second latch.

24. The method of claim 16, wherein the second latch includes a data input, a data output and a clock input, wherein the second latch is configured to pass a value at the data input to the data output responsive to the clock input being driven to a first logic state, to latch a value at the data input responsive to the clock input being transitioned from the first logic state to a second logic state, and to output the latched value to the data output responsive to the clock input being driven to the second logic state, and wherein setting the second latch to the transparent state includes holding the clock input of the second latch in the first logic state.

25. A method of executing instructions in an execution unit of the type including an execution pipeline with a plurality of pipeline stages, wherein each pipeline stage includes a latch and execution logic coupled to an output of such latch and configured to process input data stored in such latch, the method comprising:

in a first mode, clocking the latches in each of the plurality of pipeline stages at a first clock frequency such that the plurality of pipeline stages perform steps for separate instructions in each clock cycle; and in a second mode, reducing a clock frequency of a clock signal supplied to the latches in a first subset of the plurality of pipeline stages to clock the latches in the first subset of the plurality of pipeline stages at a second clock frequency that is lower than the first clock frequency, and setting the latches in a second subset of the plurality of pipeline stages to a transparent state such that, for each pipeline stage in the second subset of pipeline stages, the execution logic of such pipeline stage is merged with the execution logic of an immediately preceding pipeline stage among the plurality of pipeline stages so that such pipeline stage and immediately preceding pipeline stage perform steps for the same instruction in each clock cycle.

* * * * *